United States Patent van Remmen

[11] 3,903,910
[45] Sept. 9, 1975

[54] DEVICE FOR WASHING POTATO CUTTINGS

[75] Inventor: Hendrikus Hermanus Johannes van Remmen, Zetten, Netherlands

[73] Assignee: Instituut Voor Bewaring en Verwerking Van Landbouwprodukten, Wageningen, Netherlands

[22] Filed: Sept. 5, 1973

[21] Appl. No.: 394,467

[30] Foreign Application Priority Data
Sept. 8, 1972 Netherlands ................. 7212273

[52] U.S. Cl. .................. 134/60; 134/69; 134/104
[51] Int. Cl. .............................................. B08b 3/04
[58] Field of Search ............ 134/60, 65, 69, 78, 79, 134/104, 133, 159

[56] References Cited
UNITED STATES PATENTS

| | | | |
|---|---|---|---|
| 1,373,113 | 3/1921 | Beardsley | 134/69 X |
| 2,039,276 | 5/1936 | Ayars | 134/65 X |
| 2,238,690 | 4/1941 | Fell | 134/65 X |
| 3,506,021 | 4/1970 | Tapscott | 134/104 |

FOREIGN PATENTS OR APPLICATIONS

| | | | |
|---|---|---|---|
| 225,163 | 1/1909 | Germany | 134/60 |

*Primary Examiner*—Robert L. Bleutge
*Attorney, Agent, or Firm*—Eyre, Mann & Lucas

[57] ABSTRACT

An improved potato washer is disclosed. The washer is constructed of compartments with counterflow of water through the compartments and transfer of the potato pieces from one compartment to the next substantially free of excess water whereby substantial improvement in water quality is obtained, thus reducing pollution problems.

7 Claims, 3 Drawing Figures

DEVICE FOR WASHING POTATO CUTTINGS

The present invention relates to a device for washing potato cuttings. Washing devices of this kind usually consist of a drum provided with perforations which is rotated in a water tank. The cuttings to be washed and the washing water are supplied at the same side of the drum, the water flowing over the side walls of the water tank into channels for the discharge thereof. Inside the drum an interrupted conveyor screw is present, which is adapted to convey the cuttings to be washed to the discharge end of the drum where they are removed from the water tank by an inclined conveyor. The cuttings are then conveyed to a second water tank which serves as an after-washing apparatus and wherein also continuously water is supplied and discharged through an overflow. Both water tanks have been provided with additional nozzles for the removal of foam, in particular in the proximity of the inclined conveyors. The washing of potato cuttings in the washing device known in the art involves a considerable water consumption, while the residence time of the cuttings in the washing device is also comparatively long. In view of the comparatively long residence time of the cuttings in the water, they will absorb a great quantity of water, which water will have to be evaporated during the subsequent frying or drying of the cuttings and additional costs of energy are involved herewith. Furthermore, the device provided with two water tanks takes up comparatively large floor space. The seating of a rotatable drum is expensive and requires considerable maintenance.

Most of the disadvantages are avoided in a known device (German Patent Specification 225.163) comprising a stationary mounted trough being divided into at least three compartments positioned one behind the other with the aid of non-perforated partitions, in which the supply of washing water and the supply of cuttings to be washed are situated at opposite ends of the trough and the water may flow over the partitions in the direction of the supply of the cuttings, and a rotation shaft provided across the trough in longitudinal direction, to which shaft in each compartment a number of arms have been secured, said arms at their ends being provided with a blade.

This device uses less water, permits a shorter residence time of the cuttings in the washing device, takes up less floor space, is of simpler less expensive structure and easier to maintain. Owing to the counterflow of the cuttings and the washing water and the division into compartments, the most polluted water is discharged while the cuttings to be washed come into increasily purer water. It is important that in the various compartments a notable difference in concentration of impurities is obtained.

In the known device the washing water will be thrust in the one direction by the rotating blades so that too much water flows over the partitions, as a consequence of which the desired differences in concentration in the successive compartments would be equalised too much. This disadvanteous effect is promoted too since the blades of the known device are not perforated so that the product, lifted out from the water, may not leak out and a lot of water may fall together with the product in a next compartment.

The most important object of the invention is to avoid these disadvantages and to provide a device for washing potato cuttings of the type according to German Patent Specification 225.163 in which however a notatable difference in concentration of impurities in the various compartments may be achieved.

Therefore, a device for washing potato cuttings of the above-mentioned type is characterized in, that the portion of the partitions which lies in front of the rising part of the paths described by the arms is considerably higher than the other part of the partitions, that in each compartment an inclined sliding chute has been provided the lower end of which being just above or at the upper edge of the lower portion of a partition, and that provisions have been made to have the cuttings lifted out of the water by a blade convey into the next compartment only if the cuttings may fall on the upper portion of a sliding chute, and that the blades have been provided with perforations.

To prevent the water flowing on the sliding chutes to come into a next compartment, the lower end of the sliding chutes may be bent back in such a way, that the water flowing along the chutes will not flow in a next compartment.

The sliding of the cuttings from the blades at a moment that said cuttings have been leaked out as much as possible (i.e. if the angle between arm and vertical is less than 30° and preferably approximately 0°) may be achieved a.o. by the design of the blades, which to that end parallel to the rotating shaft must have been bent or kinked in the shape of a spoon.

Another possibility to prevent premature sliding of the cuttings from the blades consists in that the blades have been manufactured in a flat shape and that at the inner side of the rising part of the turning circle described by the blades a cylindrically bent, perforated retaining wall extends at least to a line which is 30° from the vertical plane through the shaft.

A simple embodiment of the blades, in which unobstructed sliding of the cuttings is quaranteed, is characterized in, that said blades consist of parallel rods, said rods having been welded onto a frame at their underside.

The discharge of polluted washing water preferably takes place through a water discharge orifice provided in the wall of the compartment the unwashed cuttings are conveyed to, said water discharge orifice being shielded by a grate, in which at least one of the arms in said compartment is provided with a wiping means for cleaning the grate.

A direct discharge of the washed cuttings from the compartment with the comparatively purest water may take place if in the compartment where the supply of water ends a discharge conveyor for the washed cuttings, if necessary instead of a sliding chute, has been provided in a manner, so that the washed cuttings may drop from the blades onto said conveyor.

The discharge conveyor has been provided with orifices and extends partly across a plate of the trough inclined towards the compartment, so that the comparatively pure water leaking from the cuttings may flow back into the compartment.

The invention will now be described more in detail with reference to the Figures wherein two embodiments have been given diagrammatically.

Figure 1:
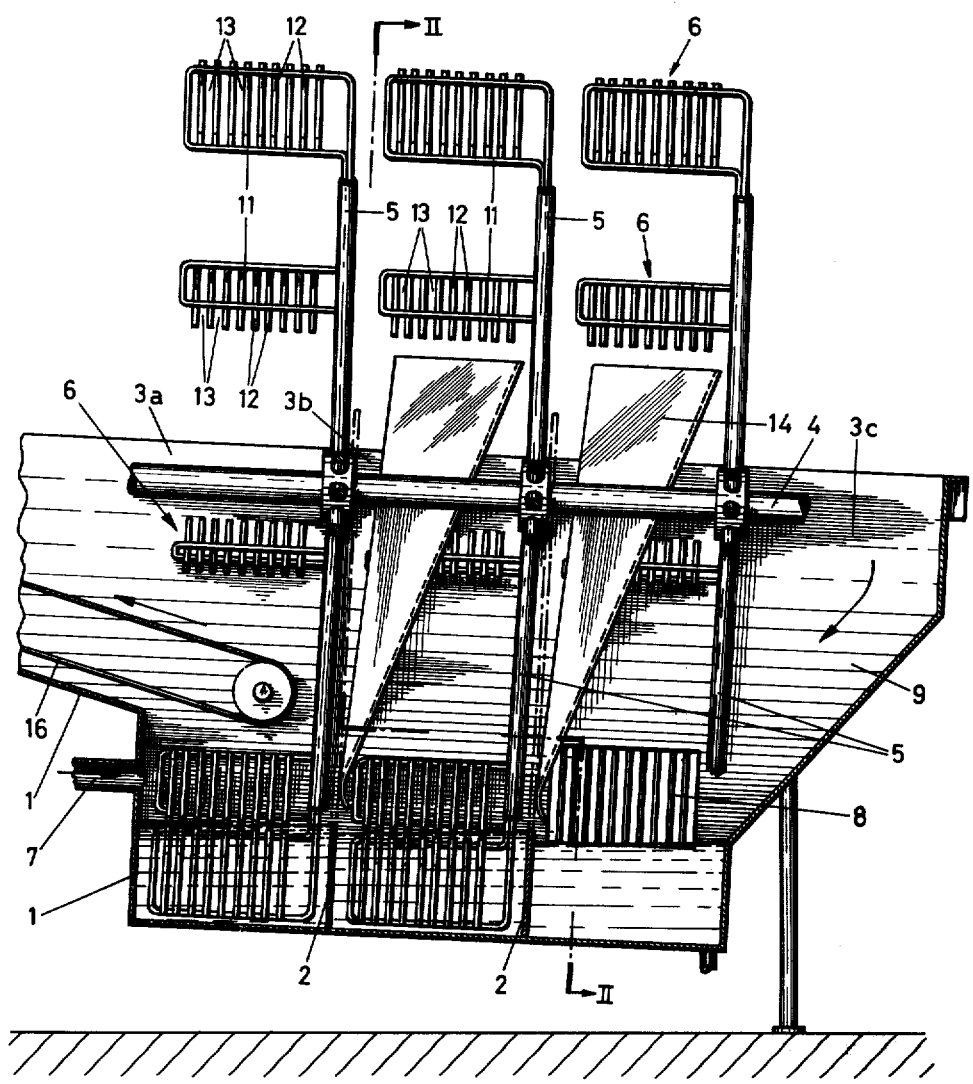
FIG. 1 shows a longitudinal section of a first embodiment.

The devices as shown in the FIGS. are designed for washing potato cuttings, in particular for the removal of starch which is liberated from the cells during the cutting of the potatoes.

The device comprises an open, preferably semi-cylindrical trough 1, which is divided into compartments 3a, 3b and 3c by partitions 2. Only three compartments are illustrated, however, in many applications there will be more of them.

A rotating shaft 4 has been provided across the trough 1, in longitudinal direction thereof. The bearings and the drive of said shaft have not been illustrated.

In each compartment at least six arms 5 have been secured to the shaft. A blade 6 provided with water through-flow orifices has been secured to the end of each arm 5.

The trough 1 is positioned at an angle to the horizontal. The washing water is supplied into compartment 3a through the pipe 7. Said water flows over the partitions 2 from one compartment to the next one and finally out of the trough 1 through orifice 8.

The cuttings are supplied in compartment 3c, said compartment having a curved portion 9 in axial direction, into which the cuttings originating from the cutting machine will fall.

Figure 2:
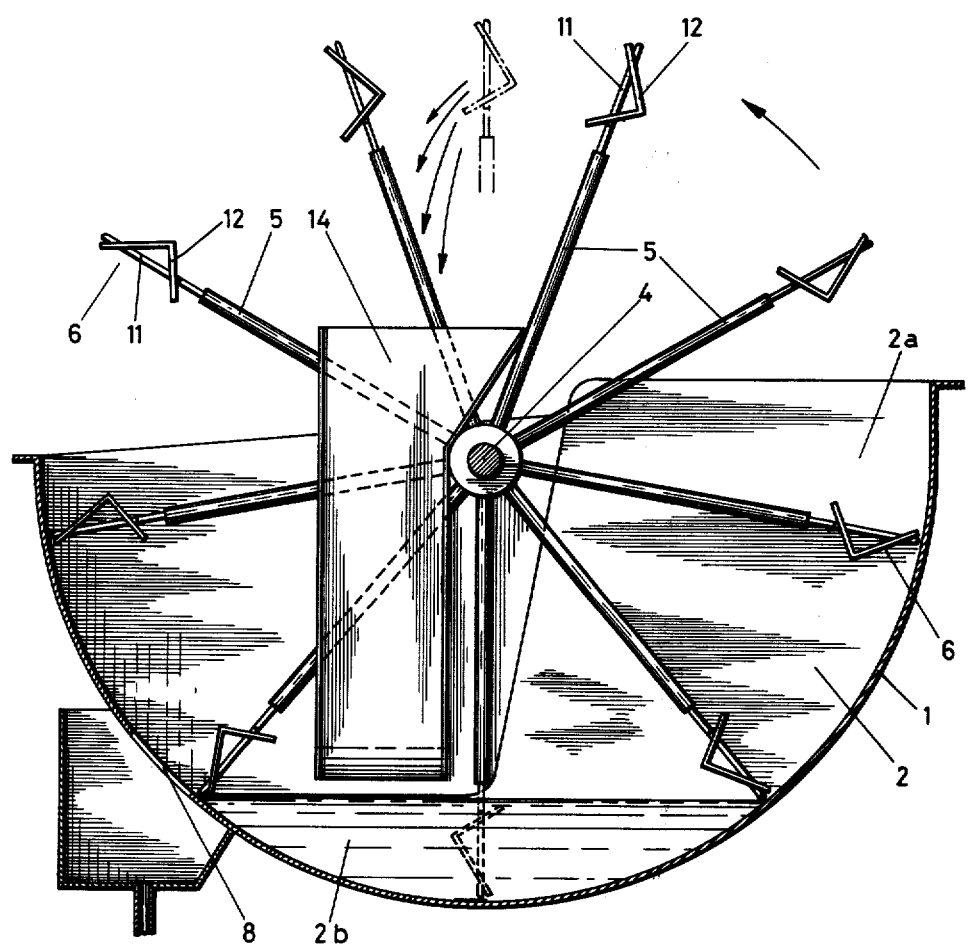
FIG. 2 shows a cross-section taken along the line II—II in FIG. 1.
Figure 3:
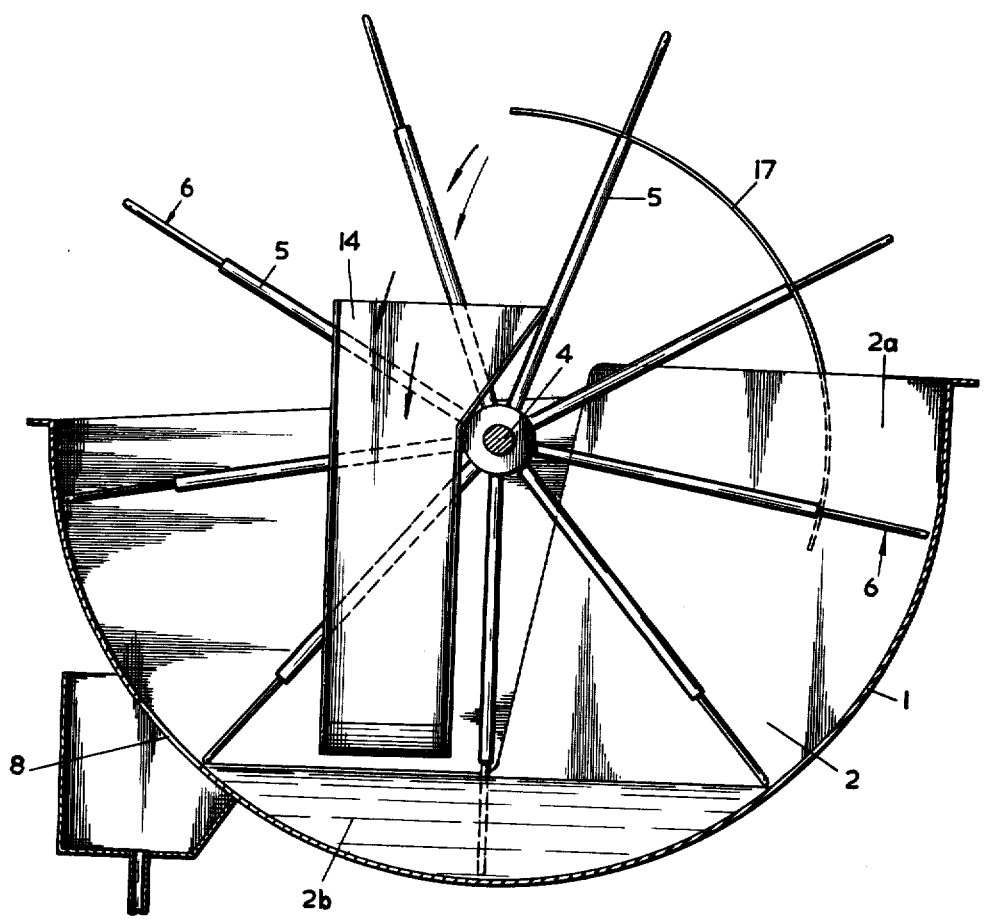
FIG. 3 shows a cross-section of a second embodiment to be compared with FIG. 2.

If the shaft 4 rotates in the direction indicated in FIG. 2, the cuttings are lifted out of the water by the blades 6. Provisions have been made to have the cuttings slide from a blade 6 only if the angle between the relative arms 5 and the vertical is 30° at the most and preferably approximately 0° (see arrows in FIGS. 2 and 3).

To this end, in the embodiment according to FIGS 1 and 2, the blades 6 are bent or kinked in the shape of a spoon according to their bending line running parallel to the shaft. As appears from FIG. 2 the part of the blades 6 lying nearest to the shaft 4 will reach a position wherein the cuttings will start to slide only when the arms take an approximately vertical upward position.

The blades 6 consist of an approximately rectangular frame 11, onto which frame a number of kinked rods 12 have been welded. The water through-flow orifices 13 between the rods are uninterrupted in the direction of sliding of the cuttings. Said cuttings cannot stick.

Inclined sliding chutes 14 are present in the compartments 3b and 3c. The material dropped from the blades 6 may slide along said chutes 14 to the next compartment.

As appears from FIG. 1 the lower edge of each sliding chute 14 is bent backwards in order to have the water flow back into the compartment appertaining to a chute, while the cuttings come into the next compartment.

A discharge conveyor 16 for the washed cuttings has been provided in compartment 3a, instead of a sliding chute 14. The cuttings dropping from the blades will come onto said conveyor and will be discharged.

The conveyor 16 has been provided with openings and extends partly above a plate 1a of the trough 1, said plate being inclined downwards in the direction of compartment 3a. Water leaking from the cuttings may flow back into compartment 3a through the openings in conveyor 16 and the inclined trough-plate 1a.

The portion 2a of the partitions 2 which lies in front of the rising part of the paths described by the arms 5 is considerably higher than the portion 2b of the partitions which lies in front of the downward paths of the arms, The thrust of water caused by the rotating arms 5 (to the right side in FIGS. 2 and 3) will therefore not load to an excessive flow of water over the partitions 2. The water through-flow from pipe 7 towards orifice 8 can be controlled by setting the inclination of the trough 1. Of course, there is also the possibility to place the trough in a horizontal position and to choose more height for the partition part 2b of the partition 2 between compartments 3a and 3b than for the partition part 2b of the partition between compartments 3b and 3c.

During operation the cuttings to be washed are conveyed into compartment 3c through the curved portion 9. In said compartment is washing water which has already passed compartments 3a and 3b and which is strongly polluted as a consequence thereof.

The cuttings are conveyed from compartment 3c to compartment 3b and from there to compartment 3a with the aid of the blades 6 and the sliding chutes 14. In compartment 3a water is present which has the lowest concentration of impurities.

Inasmuch as the cuttings drop from the blades 6 only if said blades have reached almost their highest position, the cuttings will have the opportunity to leak. This will increase the efficiency of the washing process. In addition, the differences in concentration of the washing fluid in the compartments will be rather considerable, which contributes also to an improvement of the efficiency. The result hereof is a comparatively low water consumption and a comparatively short residence time of the cuttings in the washing device, said device taking up a comparatively small floor space.

A grate has been provided in front of orifice 8, said grate retaining the cuttings. A layer of cuttings may be deposited on said grate, which might obstruct the water discharge. It is therefore preferred to provide/replace one of the blades 6 in compartment 3c with/by a brush or other wiping means which during each rotation of the shaft 4 brushes the grate in front of orifice 8.

The rods 12 welded onto the frame 11 may be bent also along their full length instead of being bent according to a sharp kink, provided that sliding of the cuttings takes place in the proximity of the vertical plane going through the shaft.

As seen from the structural point of view there are other possibilities to fulfil said last condition. One possibility has been illustrated in cross-section in FIG. 3. Corresponding parts have been indicated by the same reference numerals.

The blades 6 provided with water through-flow orifices have been manufactured in a flat shape. A cylindrically bent, perforated retaining wall 17 has been provided at the inner side of the path described by the blades. Said wall, having the same width as the blades and extending to the vertical plane through the shaft, retains the cuttings sliding over the blades in the direction of the shaft until the blades have reached their highest position.

The retaining wall 17 is secured to a portion 2a of a partition 2 present in front of said wall.

EXAMPLE

Potato cuttings were washed in a known washing device, comprising two water tanks placed one behind the other, in the first of which a rotatable drum was positioned, said drum being provided with a worm. Water was supplied to both tanks, both at the end at which the cuttings were fed to the tanks and at the end at which the cuttings were discharged from the tanks by means of an inclined conveyor. (The latter water supply served to remove foam). For a satisfactory washing result it appeared that 2 to 5 m³ of water per ton of potatoes were required, the residence time of the potato cuttings inside the device being approximately 90 seconds. The device for a capacity of 3 tons of cuttings per hour took up a floor space of 6 × 1.5 m².

Potato cuttings of the same variety were also washed in a device according to FIGS. 1 and 2, in which the trough was divided into four compartments. For the same washing results only 0.3–0.4 m³ of water was required per ton of potatoes, whereby the residence time of the cuttings in the device had to be 30–40 seconds only. The device used, with the same capacity, took up a floor space of 2.75 × 1.25 m².

I claim:

1. Device for washing potato cuttings comprising a stationary mounted trough being divided into at least three compartments positioned one behind the other with the aid of non-perforated partitions, in which the supply of washing water and the supply of cuttings to be washed are situated at opposite ends of the trough and the water flows over the partitions in countercurrent direction to the direction of advancement of the cuttings, and a rotation shaft provided across the trough in longitudinal direction, to which shaft in each compartment a number of arms have been secured, said arms at their ends being provided with a blade, characterized in, that the portion (2a) of the partitions which lies in front of the rising part of the paths described by the arms is considerably higher than the other part (2b) of the partitions such that the thrust of water caused by the rotating arms (5) and blades (6) will not lead to an excessive flow of water over the portion (2a) of the partition while water is free to flow over the portion (2b) of the partition, that in at least two of said compartments an inclined sliding chute (14) has been provided the lower end of which is at approximately the upper edge of the lower portion (2b) of a partition, a perforated blade (6) shaped to lift the cuttings out of the water and retain the cuttings on the blade so that they fall on the upper portion of said inclined sliding chute (14) whereby the cuttings are conveyed into the next compartment substantially without excess water.

2. Device according to claim 1, characterized in, that the lower end of the sliding chutes is bent back in such a way that water flowing along the chutes, may not fall in a next compartment.

3. Device according to claim 1, characterized in, that the blades (6) have been bent or kinked in the shape of a spoon parallel to the rotating shaft (4).

4. Device according to claim 1, characterized in, that the blades (6) have been manufactured in a flat shape and that at the inner side of the rising part of the turning circle described by the blades a cylindrically bent perforated retaining wall (17) extends at least to a line which is 30° from the vertical plane through the shaft.

5. Device according to claim 1, characterized in, that the blades (6) consist of parallel rods (12) said rods having been welded onto a frame (11) at their underside.

6. Device according to claim 1, characterized in, that the water discharge orifice (8) has been provided in the wall of the compartment to which the unwashed cuttings are conveyed, said water discharge orifice being shielded by a grate and that at least one of the arms (5) in said compartment has been provided with a wiping means for cleaning the grate.

7. Device in accordance with claim 1, characterized in, that the compartment where the water supply (7) ends, a discharged conveyor (16) for the washed cuttings, if necessary instead of a sliding chute (14), has been provided in a manner so that the washed cuttings may drop from the blades (6) onto said conveyor (16).

* * * * *